US009043889B2

(12) United States Patent
Awad et al.

(10) Patent No.: US 9,043,889 B2
(45) Date of Patent: May 26, 2015

(54) METHOD AND APPARATUS FOR SECURE AND RELIABLE COMPUTING

(71) Applicant: International Business Machines Corporation, Armonk, NY (US)

(72) Inventors: Mariette Awad, Essex Junction, VT (US); Deanna C. Lim, Durham, NC (US); Pascal A. Nsame, Essex Junction, VT (US); Daneyand J. Singley, Williston, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 13/786,995

(22) Filed: Mar. 6, 2013

(65) Prior Publication Data

US 2013/0185796 A1 Jul. 18, 2013

Related U.S. Application Data

(63) Continuation of application No. 12/621,570, filed on Nov. 19, 2009, now Pat. No. 8,424,071.

(60) Provisional application No. 61/169,475, filed on Apr. 15, 2009.

(51) Int. Cl.
*G06F 21/55* (2013.01)
*G06F 21/31* (2013.01)

(52) U.S. Cl.
CPC ............... *G06F 21/55* (2013.01); *G06F 21/31* (2013.01)

(58) Field of Classification Search
CPC ..... G06F 21/55; G06F 21/552; G06F 21/554; G06F 21/56; G06F 21/561; G06F 21/566; G06F 21/567; G06F 21/44; G06F 21/50; G06F 21/52; G06F 21/53

See application file for complete search history.

(56) References Cited

U.S. PATENT DOCUMENTS

| 4,758,944 | A   |   | 7/1988  | Bartley et al. |
|-----------|-----|---|---------|----------------|
| 6,336,180 | B1  |   | 1/2002  | Long et al. |
| 6,715,085 | B2  |   | 3/2004  | Foster et al. |
| 6,775,657 | B1  |   | 8/2004  | Baker |
| 6,883,099 | B2  |   | 4/2005  | Terrell et al. |
| 6,970,990 | B2  |   | 11/2005 | Rogers et al. |
| 6,976,174 | B2  |   | 12/2005 | Terrell et al. |
| 6,981,120 | B1  |   | 12/2005 | Barrus et al. |
| 7,234,038 | B1  |   | 6/2007  | Durrant |
| 7,472,288 | B1  | * | 12/2008 | Chou et al. ..................... 713/193 |
| 7,941,850 | B1  | * | 5/2011  | Satish .............................. 726/22 |
| 7,984,304 | B1  | * | 7/2011  | Waldspurger et al. ......... 713/187 |
| 2003/0093650 | A1 | * | 5/2003 | Desoli ........................... 712/209 |

(Continued)

*Primary Examiner* — Darren B Schwartz
(74) *Attorney, Agent, or Firm* — David Cain (57) ABSTRACT

In one embodiment, the invention is a method and apparatus for secure and reliable computing. One embodiment of an end-to-end security system for protecting a computing system includes a processor interface coupled to at least one of an application processor and an accelerator of the computing system, for receiving requests from the at least one of the application processor and the accelerator, a security processor integrating at least one embedded storage unit and connected to the processor interface with a tightly coupled memory unit for performing at least one of: authenticating, managing, monitoring, and processing the requests, and a data interface for communicating with a display, a network, and at least one embedded storage unit for securely holding at least one of data and programs used by the at least one of the application processor and the accelerator.

18 Claims, 5 Drawing Sheets

(56) References Cited

U.S. PATENT DOCUMENTS

| | | | |
|---|---|---|---|
| 2005/0091535 A1* | 4/2005 | Kavalam et al. | 713/201 |
| 2005/0120238 A1* | 6/2005 | Choi | 713/200 |
| 2005/0149749 A1* | 7/2005 | Van Brabant | 713/200 |
| 2006/0064546 A1 | 3/2006 | Arita et al. | |
| 2006/0075492 A1* | 4/2006 | Golan et al. | 726/22 |
| 2006/0265749 A1* | 11/2006 | Kwon et al. | 726/24 |
| 2007/0162554 A1 | 7/2007 | Branda et al. | |
| 2007/0174479 A1 | 7/2007 | Sperry et al. | |
| 2007/0180490 A1 | 8/2007 | Renzi et al. | |
| 2008/0066179 A1* | 3/2008 | Liu | 726/24 |
| 2008/0109903 A1 | 5/2008 | Werner et al. | |
| 2009/0199297 A1* | 8/2009 | Jarrett et al. | 726/24 |
| 2010/0005531 A1* | 1/2010 | Largman et al. | 726/24 |
| 2010/0017879 A1* | 1/2010 | Kuegler et al. | 726/23 |

* cited by examiner

METHOD AND APPARATUS FOR SECURE AND RELIABLE COMPUTING

CROSS REFERENCE TO RELATED APPLICATIONS

This application is a continuation of co-pending U.S. patent application Ser. No. 12/621,570, filed Nov. 19, 2009, which in turn claims the benefit of U.S. Provisional Patent Application Ser. No. 61/169,475, filed Apr. 15, 2009. Both of these applications are herein incorporated by reference in their entireties.

BACKGROUND OF THE INVENTION

The present invention relates generally to self-managed and self-healing computing environments, and relates more specifically to systems for providing end-to-end tolerance to field functional fails, virus attacks, spyware, and intrusions.

Figure 1:
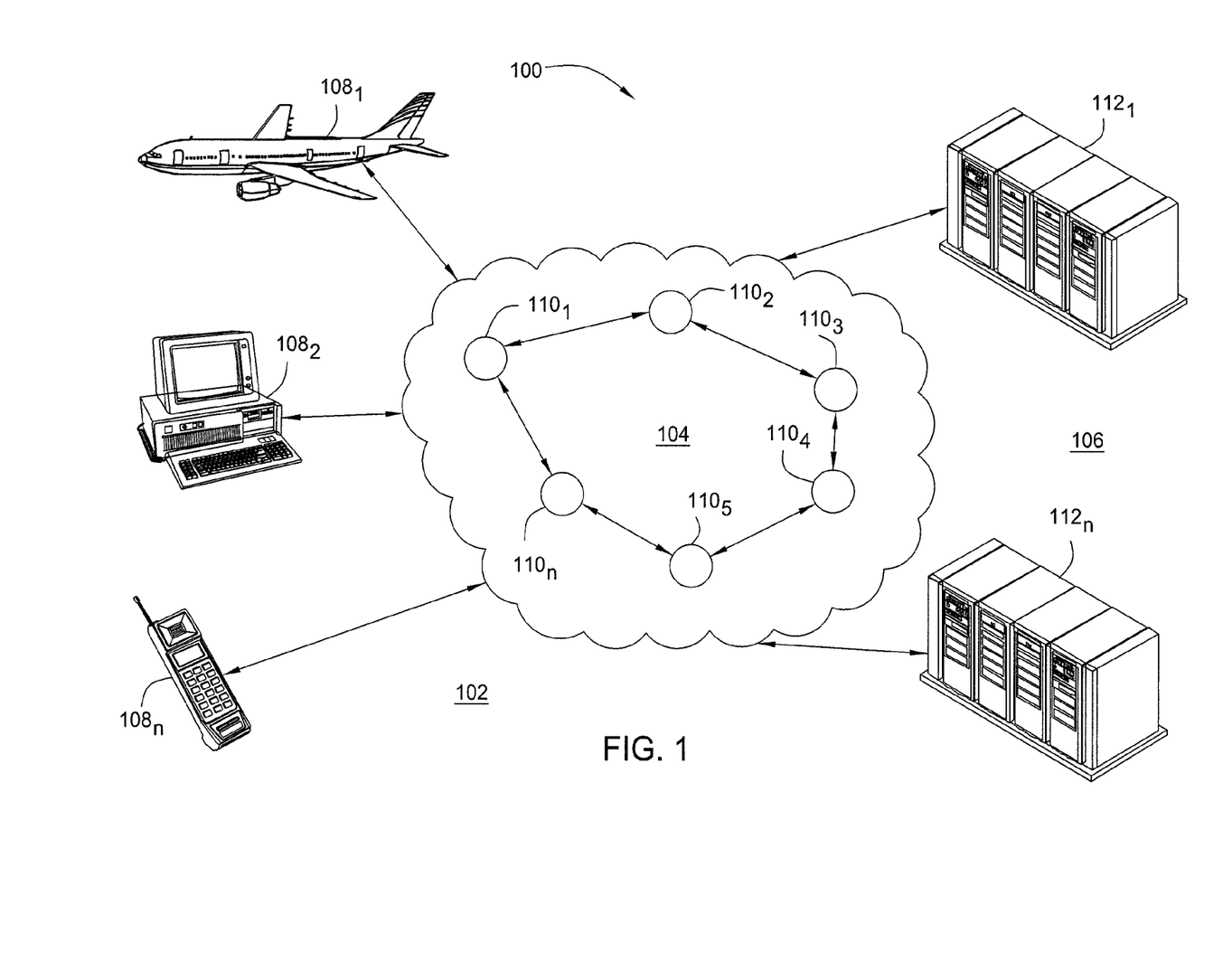
FIG. 1 is a schematic diagram illustrating an exemplary computing environment.

FIG. 1 is a schematic diagram illustrating an exemplary computing environment 100. As illustrated, the computing environment 100 comprises a plurality of connected subsystems 102, 104, and 106.

Specifically, the first subsystem 102 comprises a plurality of endpoints $108_1$-$108_n$ (hereinafter collectively referred to as "endpoints 108"), such as user devices. For instance, the endpoints 108 may include personal computers, telephones, mobile devices (e.g., cellular telephones, personal digital assistants, etc.), gaming consoles, navigation systems, workstations, and the like. Endpoints are typically protected by systems that focus on system access validation, such as systems relying on encryption.

The second subsystem 104 comprises a communication network, where the network may include, for example, a plurality of interconnected nodes $110_1$-$110_n$ (hereinafter collectively referred to as "nodes 110"). The channels connecting the nodes 110 are typically protected by communications security standards such as Internet Protocol Security (IPSec), Secure Sockets Layer (SSL), or High Assurance Internet Protocol Encryptor (HAIPE).

The third subsystem 106 comprises a plurality of data centers $112_1$-$112_n$ (hereinafter collectively referred to as "data centers 112"). The data centers 112 are typically protected by a combination of hardware and software security.

Any of the subsystems 102, 104, and 106 is susceptible to functional fails, virus attacks, spyware, and intrusions, among other security and reliability issues. Conventional means for securing these subsystems 102, 104, and 106, however, focus on the individual subsystems 102, 104, and 106 and do not provide end-to-end security for the computing environment 100 as a whole.

Thus, there is a need in the art for a method and apparatus for secure and reliable computing in an end-to-end manner.

SUMMARY OF THE INVENTION

In one embodiment, the invention is a method and apparatus for secure and reliable computing. One embodiment of an end-to-end security system for protecting a computing system includes a processor interface coupled to at least one of an application processor and an accelerator of the computing system, for receiving requests from the at least one of the application processor and the accelerator, a security processor integrating at least one embedded storage unit and connected to the processor interface with a tightly coupled memory unit for performing at least one of: authenticating, managing, monitoring, and processing the requests, and a data interface for communicating with a display, a network, and at least one embedded storage unit for securely holding at least one of data and programs used by the at least one of the application processor and the accelerator In another embodiment, a method for processing a request made by a user of a computing system, the request comprising a request to load an application, run an application, load an operating system, configure an operating system, run an operating system, or access a hardware resource, includes receiving the request from the user, authenticating the request in accordance with at least one of a user access profile representing one or more normal patterns of use by the user, an application authentication profile representing normal behavior of an application associated with the requests, or a registered owner trace representing who created the application, granting the request if the request is authenticated, blocking the request if the request is not authenticated, and performing recovery operations if the request is confirmed to be a thread.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention is a method and apparatus for secure and reliable computing. Embodiments of the invention may be implemented in a variety of computing environment subsystems that use shared or distributed memory to run applications. Specifically, embodiments of the invention use a combination of hardware and software that recognize legitimate user requests and resource utilization trends, making it possible to detect functional fails, virus attacks, spyware, and intrusions among other security and reliability issues. This enables the protection of substantially all computing environment resources, even after authentication.

Figure 2:
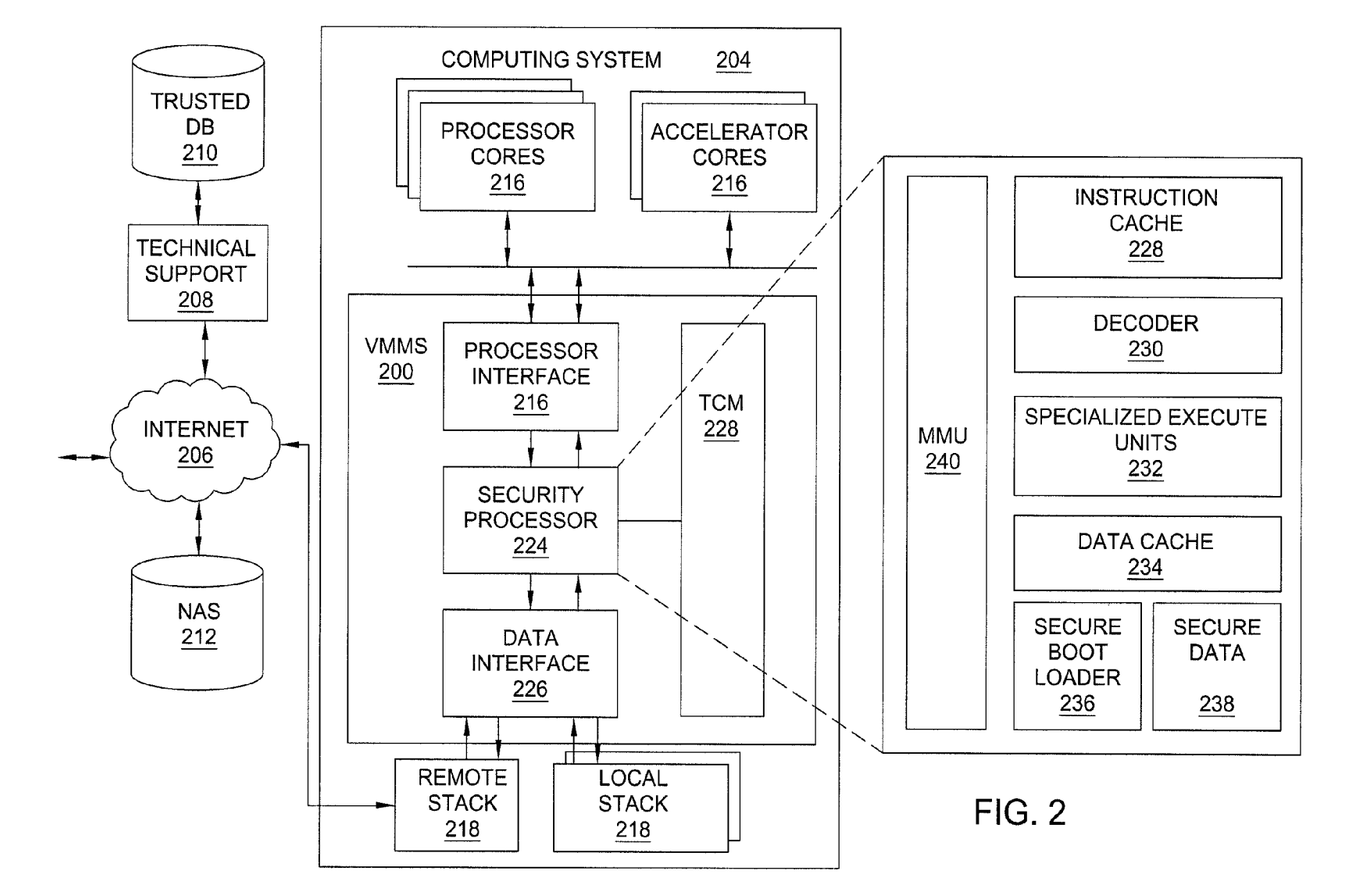
FIG. 2 is a schematic diagram illustrating one embodiment of a security system for providing secure computing, according to the present invention.

FIG. 2 is a schematic diagram illustrating one embodiment of a security system 200 for providing secure computing, according to the present invention. In one embodiment, the security system is a secure virtualized memory management server (VMMS). The end-to-end security system 200 serves two major purposes: (1) to prevent attacks on the computing system 204 that it is designed to protect; and (2) to restore the computing system's configuration if an attack succeeds in part. As illustrated, the end-to-end security system 200 is integrated in a customizable computing system 204. In one embodiment, the computing system 204 is the customized component of any of the computing environment subsystems 102, 104, or 106 illustrated in FIG. 1.

As illustrated, the computing system 204 is connected, via a network 206 such as the Internet, to a technical support location 208 and to a network-attached storage (NAS) 212 that stores data and application codes required by the computing system's software stacks (discussed in greater detail below). The technical support location 208 provides remote services for ensuring the reliability and security of the computing system 204. To that end, the technical support location 208 is further connected to a trusted database 210 in which snapshots of configurations for the computing system 204 are stored. These snapshots may be used to securely and remotely restore the computing system configuration in the event that the computing system 204 is the victim of a partially successful attack.

The computing system 204 comprises one or more application processor cores 214 (i.e., where applications run) and one or more accelerator cores 216 that are in communication with the integral security system 200. In one embodiment, the computing system 204 further comprises a network or display interface in communication with the application processor cores 214 and accelerator cores 216. In addition, the computing system 204 comprises a remote software stack 218 (including online applications) and a local software stack 220 (including desktop applications) that are also in communication with the security system 200.

The end-to-end security system 200 as a whole operates as an interface between the application processor cores 214 and the computing environment 100. To this end, the security system 200 comprises a processor interface 222 with integrated embedded storage units, a security processor 224 with integrated embedded storage units, a data interface 226 with integrated embedded storage units, and a tightly coupled memory (TCM) unit 228. The processor interface 222 interfaces the security processor 224 to the application processor cores 214 and the accelerator cores 216. In one embodiment, the processor interface 222 comprises an adaptive arbiter. Similarly, the data interface 226 interfaces the security processor 224 to the remote software stack 218 and the local software stack 220 and manages communications between the security processor 224 and memory devices and/or networked devices. In one embodiment, the data interface 226 comprises an adaptive cache. In a further embodiment, the adaptive cache is configured as a coherent input/output (I/O) cache for improved performance efficiency. In an alternative embodiment, the adaptive cache is configured as a tightly coupled memory for improved power efficiency. In one embodiment, the TCM unit 228 holds data relating to user access profiles (UAPs), application authentication profiles (AAPs), and registered owner traces (ROTS), as described in further detail below.

Figure 3:
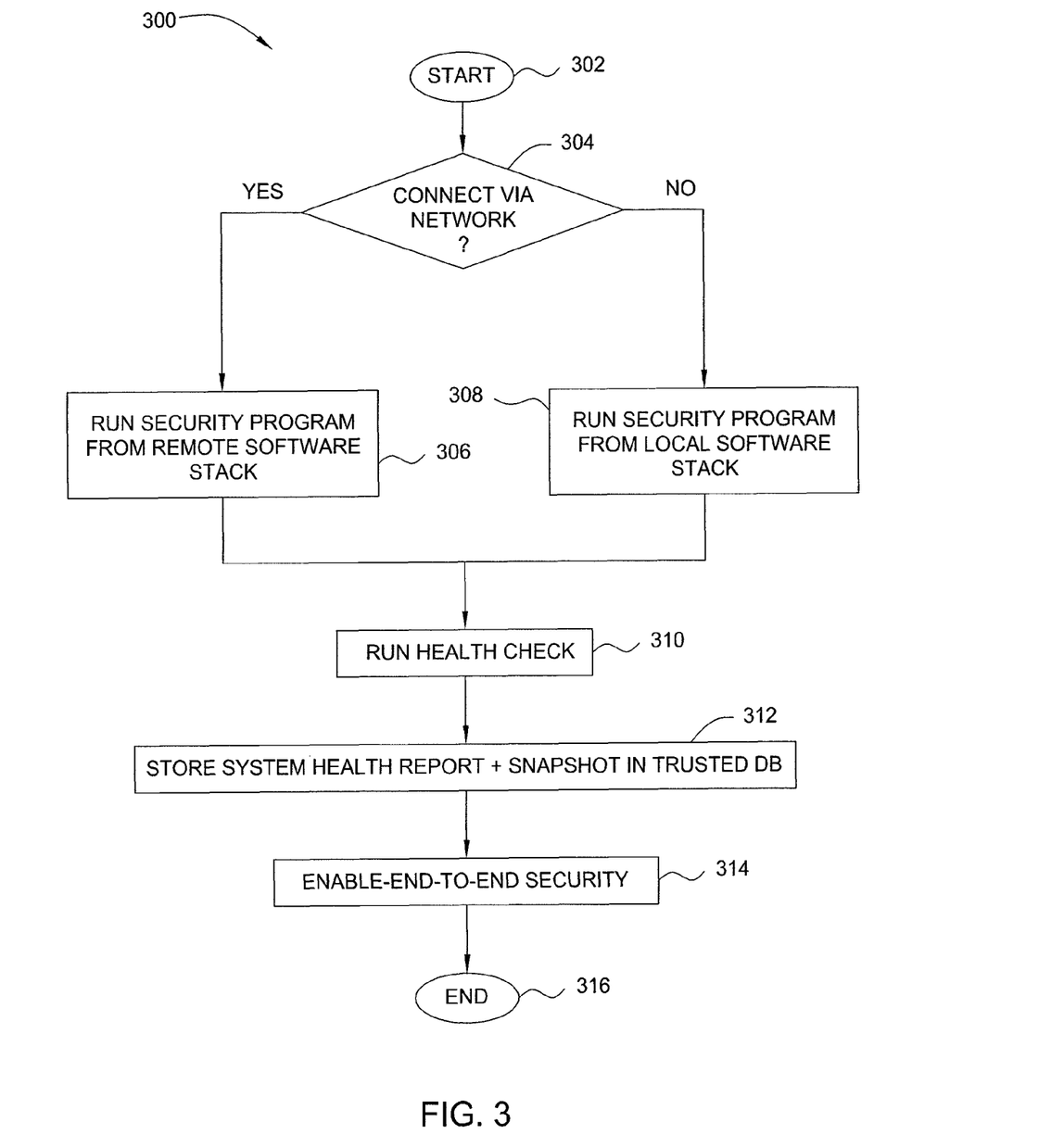
FIG. 3 is a flow diagram illustrating one embodiment of a method for booting an end-to-end security system, according to the present invention.

The security processor 224 manages authentification and application/hardware/software access requests from the processor interface 222 based on pattern rules and attribute profiles. The security processor 224 is programmed to initiate network connections across a network (such as the Internet) to the trusted database 210 or to another customized computing system that integrates the disclosed VMMS and that is part of the computing environment 100. The security processor 224 is illustrated in cutaway and comprises an instruction cache 228, a decoder 230, a plurality of specialized execute units 232, a data cache 234, a secure boot loader 236, secure data 238, and a MMU 240. In one embodiment, the secure boot loader 236 and secure data 238 are embedded non-volatile storage units that store a security program and profile data used by the security program, respectively. In one embodiment, the security processor 224 operates as a profile-based application layer firewall, as discussed in greater detail below FIG. 3 is a flow diagram illustrating one embodiment of a method 300 for configuring an end-to-end security system, according to the present invention. The method 300 may be implemented, for example, by the security system 200 of FIG. 2 to enable end-to-end security of the computing system 204.

The method 300 is initialized at step 302 and proceeds to step 304, where the security system determines whether to configure the end-to-end security system over a network connection (e.g., a connection to the network 206 of FIG. 2). If the security system concludes in step 304 that it will configure the end-to-end security system over a network connection, the method 300 proceeds to step 306, where the security system runs a security program from a remote software stack (e.g., remote software stack 218 of FIG. 2). Alternatively, if the security system concludes in step 304 that it will not configure the end-to-end security system over a network connection, the method 300 proceeds to step 308, where the security system runs a security program from a local software stack (e.g., local software stack 220 of FIG. 2).

Once the computing system has been booted from the remote software stack or the local software stack, the method 300 proceeds to step 310, where the security system runs a health check of the computing system being protected. When running the health check, the security system generates a health report that identifies the current state of the computing system and takes a snapshot of the current system configuration.

In step 312, the security system stores the health report and system configuration snapshot in a remote trusted database (e.g., trusted database 210 of FIG. 2). The security system then enables end-to-end security in step 314. In one embodiment, the end-to-end security is enabled via the security processor (e.g., security processor 224 of FIG. 2). The method 300 then terminates in step 316.

As discussed above, in one embodiment, end-to-end security is enabled via a profile-based application layer firewall. The firewall detects specific patterns outside of a normal profile, for example by applying a clustering scheme or an outlier detection algorithm. Any activity that deviates from the normal profile is tagged by the firewall as suspicious.

Figure 4:
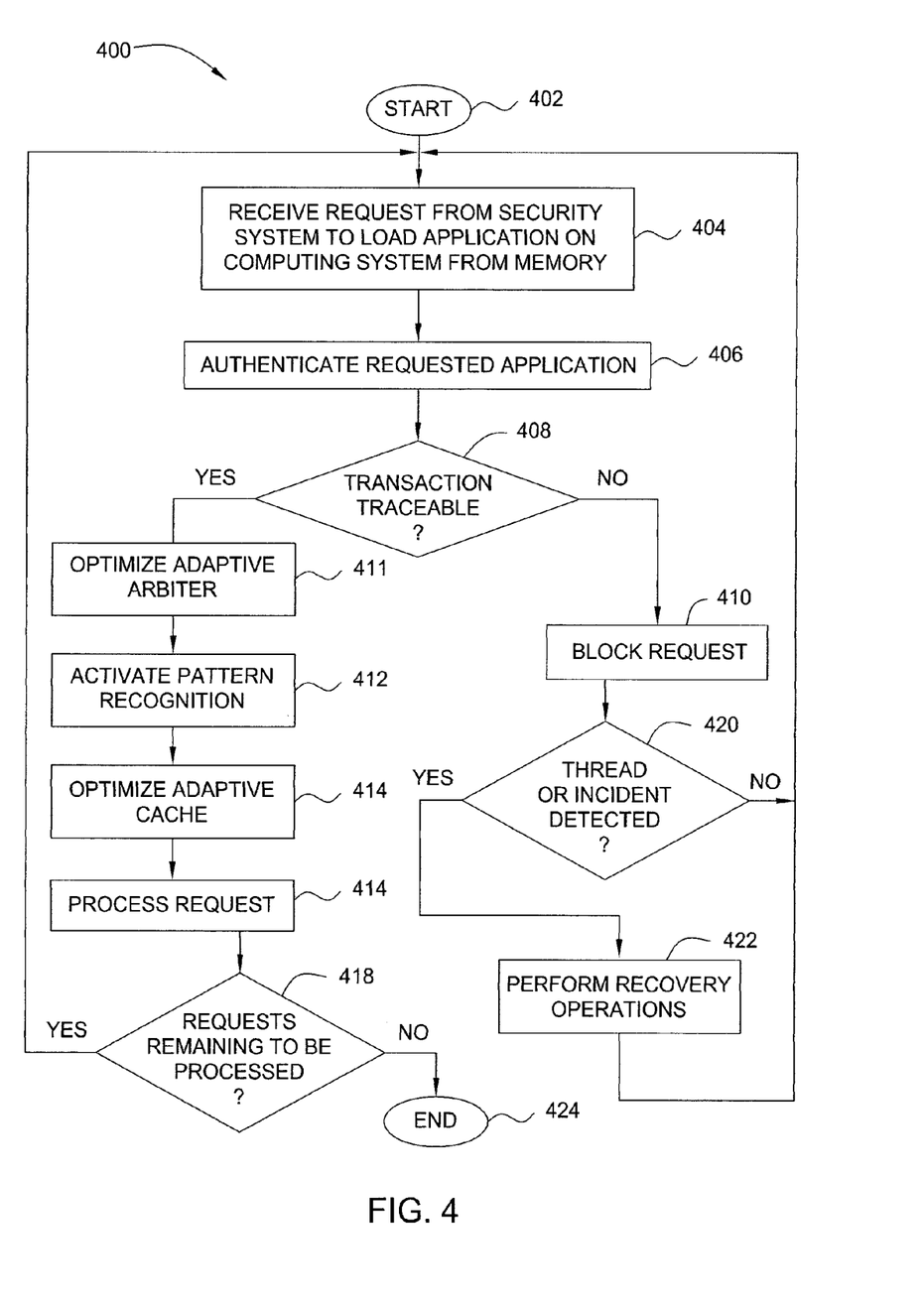
FIG. 4 is a flow diagram illustrating one embodiment of a method for enabling end-to-end security, according to the present invention.

FIG. 4 is a flow diagram illustrating one embodiment of a method 400 for enabling end-to-end security, according to the present invention. The method 400 may be implemented, for example, at the security system 224 of FIG. 2.

The method 400 is initialized at step 302 and proceeds to step 304, where the processor interface (e.g., processor interface 222 of FIG. 2) receives a request (e.g., from a processor core 214) to load or run an application on the associated computing system from memory and/or to access hardware resources. The request, also referred to as a "virtual service request" or VSR, may be authorized or unauthorized; it is up to the security processor to make that determination as discussed further below.

In step 406, the security processor authenticates (validates and/or encrypts) the requested application. In one embodiment, the security processor authenticates a VSR by examining an AAP associated with the application. The AAP comprises attributes of the application that represent normal operations and/or request patterns for the application (e.g., the way the application requests resources, how the application runs, etc.). For instance, the AAP may be compiled based on one or more of: a user profile, typical request trends, request rates, and total memory size to be shared. In one embodiment, the AAP is stored in memory in the security processor (e.g., in the secure data flash memory 238 or the TCM unit 228).

In step 408, the security processor determines how "safe" the request is (e.g., whether the requested transaction is traceable). In one embodiment, this determination is made in accordance with at least one of: the AAP, an ROT, and a UAP that comprise attributes reflecting normal patterns of use by the user of the computing system. In further embodiments, the determination also considers a rate of requests per user and/or virus/intrusion signatures. In one embodiment, the determination is made using at least one of fuzzy logic, machine learning, or probabilistic reasoning (e.g., prior probability, distance delta covariance, or entropy-based rules). In one embodiment, an ROT is based on a public/private key derivative and indicates who created the requested application. In one embodiment, the UAP indicates who is requesting/running the application now and is based on at least one of: user login habits, user application requests, user fingerprint(s), digitized user voice segments, and a segmented image of the user. In one embodiment, the ROT and the UAP are stored in memory in the security processor (e.g., in the secure data flash memory 238 or the TCM unit 228).

If the security processor concludes in step 408 that the requested transaction is not traceable, the method 400 proceeds to step 410, where the security processor blocks the request before the method 400 returns to step 404 for processing of a next request. The method 400 then proceeds to step 420, where the security processor determines whether a thread or incident has been detected. If the security processor concludes in step 420 that a thread or incident has been detected, the security processor performs recovery operations in step 422. Alternatively, if the security processor concludes in step 420 that a thread or incident has not been detected, the method 400 returns to step 404 for processing of a next request.

Alternatively, if the security processor concludes in step 408 that the requested transaction is traceable, the method 400 proceeds to step 411, where the security processor optimizes the allocation of the adaptive arbiter (e.g., of the processor interface 216). This minimizes the bandwidth and throughput impact resulting from operations of the security system.

In step 412, the security processor fulfills the requested transaction while activating a pattern recognition algorithm (e.g., a least square support vector machine model). The pattern recognition algorithm operates while the requested application is running and monitors the behavior of the application against patterns representing normal behavior of the application. In one embodiment, the patterns are stored in memory in the security processor (e.g., in the secure data flash memory 238 or the TCM unit 228). In one embodiment, the requested transaction is not fulfilled and the pattern recognition is not activated until a final assessment is made based on the available bandwidth and the power of the computing system to update the AAP.

In step 414, the security processor optimizes allocation of the adaptive cache (e.g., of the data interface 226). This makes the security system substantially transparent to the normal operation of the application now running on the computing system. This in turn minimizes overhead and performance impact resulting from operation of the security system. In one embodiment, optimization is performed in accordance with system performance and power efficiency rules stored in memory in the security processor (e.g., in the secure data flash memory 238 or the TCM unit 228). Once the adaptive cache has been optimized, the security processor processes the current request in step 416.

In step 418, the security processor checks to see if there are any other requests remaining to be processed. If the security processor concludes in step 418 that there is at least one request remaining to be processed, the method 400 returns to step 404 for processing of the next request. Alternatively, if the security processor concludes in step 418 that there are no requests remaining to be processed, the method 400 terminates in step 424.

It should be noted that a request receives by the security system could also be blocked during monitoring of the running application (i.e., while the pattern recognition algorithm is activated). For instance, if a pattern of use is detected in the running application that deviates from the normal patterns of use, the security processor may block the application at such a time.

Figure 5:
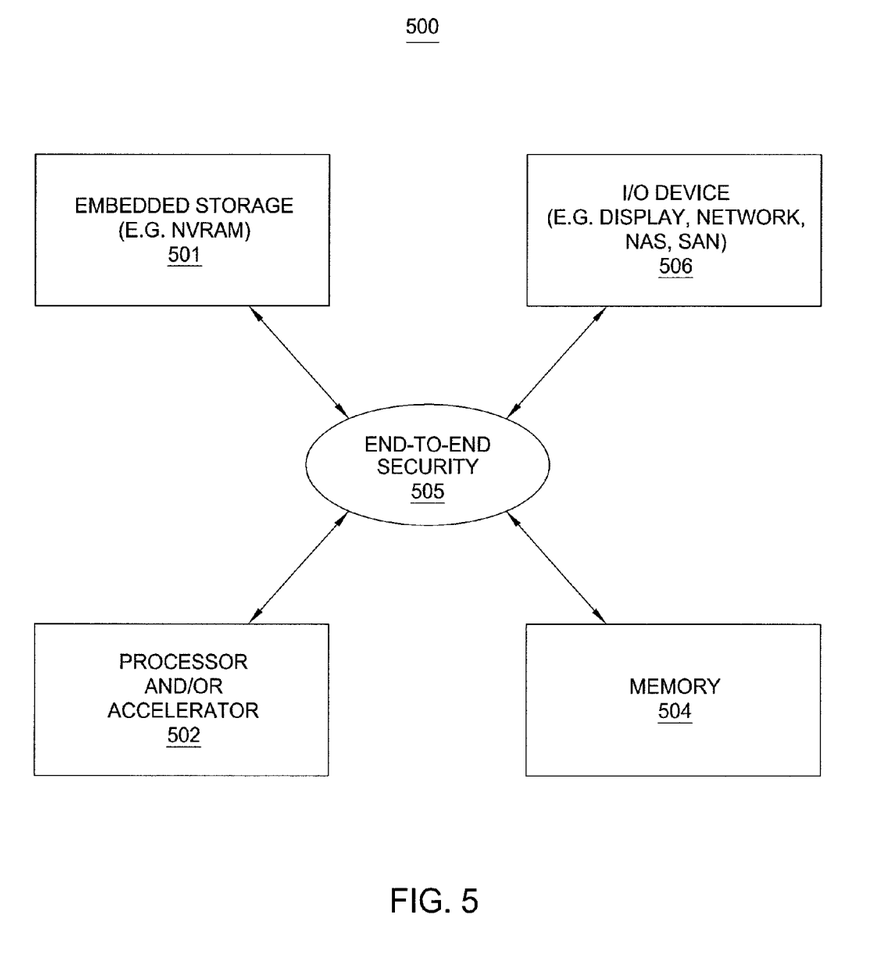
FIG. 5 is a high level block diagram of the present computing system security method that is implemented using a general or special purpose computing device.

FIG. 5 is a high level block diagram of the present computing system end-to-end security method that is implemented using a general or special purpose computing device 500. In one embodiment, a general purpose computing device 500 comprises an embedded storage (e.g., non-volatile static random access memory) a processor 502, a memory 504, a security module 505 and various input/output (I/O) devices 506 such as a display, a keyboard, a mouse, an imaging device, a global positioning system, a modem, a microphone, a speaker, a network connection and the like. In one embodiment, at least one I/O device is a network device (e.g., a storage area network, a network attached storage, a disk drive, flash memory, an optical disk drive, a floppy disk drive). It should be understood that the security module 505 can be implemented as a physical device or subsystem that is coupled to a processor through a communication channel.

Alternatively, the security module 505 can be represented by one or more software applications (or even a combination of software and hardware, e.g., using Application-Specific Integrated Circuits (ASIC)), where the software is loaded from an embedded storage 501 and/or an I/O device (e.g., network devices 506) and operated by the processor 502 from the memory 504 of the general or special purpose computing device 500. Additionally, the software may run in a distributed or partitioned fashion on two or more computing devices similar to the general purpose computing device 500. Thus, in one embodiment, the security module 505 for enabling end-to-end security in a computing environment described herein with reference to the preceding figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments, such as configuring the operating system software to run on the security processor 224 of FIG. 2 instead of on the processor core 216 for improved performance and energy efficiency. Furthermore, terms such as top, side, bottom, front, back, and the like are relative or positional terms and are used with respect to the exemplary embodiments illustrated in the figures, and as such these terms may be interchangeable.

What is claimed is:

1. An end-to-end security system for protecting a computing system, comprising:
   a processor interface coupled to an application processor of the computing system, for receiving requests from the application processor;
   a security processor connected to the processor interface for processing the requests;
   a first memory unit coupled to the security processor and storing data for use by the security processor in authenticating the requests and in determining, subsequent to the authenticating, whether transactions requested by authenticated requests are traceable;
   a data interface coupled to the security processor and including an adaptive cache for use by the security processor in performing, subsequent to the determining, allocation of the cache in advance of granting the authenticated requests; and
   a second memory unit coupled to the security processor and storing patterns for use by the security processor in monitoring, subsequent to the granting, behaviors of applications that are run or loaded as a result of the granting.

2. The end-to-end security system of claim 1, wherein the data interface manages communications between the security processor and a memory device.

3. The end-to-end security system of claim 2, wherein the adaptive cache comprises an embedded storage unit.

4. The end-to-end security system of claim 1, wherein at least one of the first memory unit or the second memory unit is embedded in the security processor.

5. The end-to-end security system of claim 1, wherein the end-to-end security system comprises a virtualized memory management server integrated with the computing system.

6. The end-to-end security system of claim 1, wherein the end-to-end security system interfaces the computing system to a computing environment comprising a plurality of connected subsystems.

7. A method for processing a request made by an application processor of a computing system, the method comprising:
   receiving the request by a processor interface coupled to the application processor;
   authenticating the request by a security processor coupled to the processor interface, wherein the authenticating comprises verifying that the request is consistent with normal operations or request patterns;
   determining whether a transaction requested by the request is traceable, wherein the determining is performed subsequent to the request being authenticated;
   optimizing an allocation of an adaptive cache when the transaction is determined to be traceable, wherein the optimizing is performed subsequent to the determining;
   granting the request when the request is authenticated and determined to be traceable, wherein the granting is performed subsequent to the optimizing; and
   monitoring a behavior of an application that is run or loaded as a result of the granting, wherein the monitoring is performed subsequent to the granting.

8. The method of claim 7, wherein the monitoring comprises:
   comparing the behavior of the application to a pattern representing a normal behavior of the application.

9. The method of claim 8, wherein the pattern representing the normal behavior of the application is stored in the security processor.

10. The method of claim 7, wherein the request is a request to load or run an application.

11. The method of claim 7, wherein the normal operations or request patterns are stored as attributes in the security processor.

12. The method of claim 7, wherein the determining is based at least in part on the normal operations or request patterns for the application.

13. The method of claim 7, wherein the determining is based at least in part on an identity of a creator of the application.

14. The method of claim 13, wherein the identity of the creator is indicated by data stored in the security processor.

15. The method of claim 7, wherein the determining is based at least in part on an identity of a user from whom the request originated.

16. The method of claim 15, wherein the identity of the user is indicated by data stored in the security processor.

17. A method for securing a computing system, the method comprising:
   receiving a request for a transaction at a security system that couples an application processor of the computing system to an external computing environment, where the transaction includes running or loading an application on the computing system;
   authenticating the request by the security system, wherein the authenticating comprises verifying that the request is consistent with normal operations or request patterns;
   determining whether the transaction is traceable, wherein the determining is performed subsequent to the request being authenticated;
   optimizing an adaptive cache of the security system to render the security system transparent to the application, wherein the optimizing is performed subsequent to the transaction being determined to be traceable;
   granting the request, subsequent to the optimizing; and
   monitoring a behavior of the application, subsequent to the granting.

18. The method of claim 17, wherein the transaction is executed after it is determined that the transaction is traceable.

* * * * *